United States Patent

Hall et al.

[11] Patent Number: 5,979,642
[45] Date of Patent: Nov. 9, 1999

[54] EXTENDABLE MODULAR CONVEYOR ASSEMBLY

[75] Inventors: Kevin Ross Hall, Franklin, Pa.;
Gordon Wilkinson, Unanderra, Australia

[73] Assignee: Australian Longwall Pty Limited, Australia

[21] Appl. No.: 08/802,246

[22] Filed: Feb. 19, 1997

[51] Int. Cl.⁶ .................................................. B65G 15/60
[52] U.S. Cl. ..................... 198/812; 198/594; 198/588; 198/309
[58] Field of Search .................. 198/812, 594, 198/588, 309

[56] References Cited

U.S. PATENT DOCUMENTS

| | | | |
|---|---|---|---|
| 3,310,158 | 3/1967 | Reilly | 198/812 X |
| 3,826,353 | 7/1974 | Greasley | 198/812 X |
| 4,245,738 | 1/1981 | Butcher et al. | 198/812 |
| 4,684,314 | 8/1987 | Luth . | |
| 4,869,358 | 9/1989 | Chandler | 198/309 |
| 5,046,603 | 9/1991 | Odenthal | 198/812 |
| 5,181,600 | 1/1993 | Chappell et al. | 198/812 |
| 5,596,865 | 1/1997 | Kramer | 198/812 X |

FOREIGN PATENT DOCUMENTS

| | | |
|---|---|---|
| 698477 | 10/1953 | United Kingdom . |
| 713305 | 8/1954 | United Kingdom . |
| 767098 | 1/1957 | United Kingdom . |
| 770438 | 3/1957 | United Kingdom . |
| 1151422 | 5/1969 | United Kingdom . |

OTHER PUBLICATIONS

Oliver Corp., Farqhar Div., Conveyor Department brochure on Expand–O–Veyor Model 439 Conveyor, pp. 1–9, received in PTO May 22, 1953.

*Primary Examiner*—Christopher P. Ellis
*Assistant Examiner*—Steven B. McAllister
*Attorney, Agent, or Firm*—Graham & James LLP

[57] ABSTRACT

A conveyor assembly (11) for attachment to a conveyor belt boot end (10) for use in a mine. The conveyor assembly (11) includes two conveyor modules (12) and (13) which are towed by the boot end (10). The two conveyor modules (12) and (13) enable assembly of a conveyor structure (16) to support the conveyor belt (17). The conveyor structure (16) is constructed during movement of the boot end (10).

8 Claims, 7 Drawing Sheets

EXTENDABLE MODULAR CONVEYOR ASSEMBLY

TECHNICAL FIELD

The present invention relates to conveyors and more particularly but not exclusively to conveyors employed in mines.

BACKGROUND OF THE INVENTION

In underground mining, the belt boot end delivers the product, such as coal, being mined to a conveyor structure arranged behind the boot end. As the boot end progresses, the conveyor structure needs to be lengthened.

In previously known structures ultimately the belt needs to be "broken" or stopped to enable structure to be added to the conveyor system.

It is the disadvantage of the above discussed conveyors that the mining operation must cease when the belt is "broken" or stopped.

OBJECT OF THE INVENTION

It is the object of the present invention to overcome or substantially ameliorate the above disadvantage.

SUMMARY OF THE INVENTION

There is disclosed herein a conveyor module to support a conveyor belt, said structure comprising:
 a base frame;
 an upper frame supported on the base frame for generally vertical movement relative to the base frame;
 motor means extending between the base frame and the upper frame to cause the generally vertical movement when required; and
 belt support means on said upper frame to support portion of said belt for movement relative to said base frame.

There is further disclosed herein a method of forming a mine conveyor structure, said method including the steps of;
 advancing a conveyor boot end along a mine tunnel;
 having a conveyor belt extend along the mine tunnel with an end portion moving with the boot end to receive mined material therefrom;
 supporting a belt on a conveyor structure which is stationary with respect to the mined tunnel; and
 adding to the conveyor structure at a location behind the boot end but adjacent thereto, during movement of the boot end.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENT

In the accompanying drawings there is schematically depicted a conveyor belt boot end 10 for use in a mine. Towed by the boot end 10 is a conveyor assembly 11 which in this embodiment includes two conveyor modules 12 and 13. If so required, further similar modules may be added. The module 12 is towed by the boot end 10 by means of a bar 14. The module 13 is towed by the module 12 by means of a bar 15.

The modules 12 and 13 are provided to enable a conveyor structure 16 to be formed and to trail the modules 12 and 13. The modules 12 and 13 and structure 16 support a conveyor belt 17 having a portion "A" which travels towards the boot end 10, and a portion "B" which travels away from the boot end 10 and takes with it material being mine, such as coal.

As the boot end 10 progresses, the structure 16 is assembled, allowing the boot end 10 to progress without interruption. As the structure 16 is formed, it is left behind as the modules 12 and 13 move with the boot end 10.

The module 12 includes a base frame having four upright posts 18, located at the four corners of the module 12. Extending transversely between the posts 18 are beams 19. A "skid" pad 20 extends between the beams 19. The skid pad 20 rests on the floor of the mine and allows the module 12 to be dragged there across.

Supported in each post is a hydraulic elevating cylinder 21 which supports a piston rod 22. Extending longitudinally between the piston rods 22, on each side of the module 12, is an upper frame compressing longitudinal beams 23. The beams 23 have extending between them roller assemblies 24. Each roller assembly 24 includes a plurality of rollers 25 with each engaging the belt 17. The rollers 25 are flexibly coupled by being attached to the beam 23 by means of hooks 26.

Also extending between the posts 18 are transverse belt supporting bars 27 over which the belt 17 passes so as to be supported thereby.

Also extending between the beams 23 is a set "skid" bars 28 supported by pairs of links 29.

The conveyor structure 16 consists of a plurality of equally spaced transom frames 30, which are of a "H" configuration so as to have a pair of upright members 31 joined by a transverse member 32. Each frame 30 further includes a plurality of rollers 41 which are to support the lower portion of the belt 17 "A". Each member 31 terminates at its upper end with a cradle 33.

Extending longitudinally of the structure 16 and being supported by and extending between the transom frames 30 are stringers 34 which are received within the cradles 33. Pins are then used to secure the stringers 34 in position.

Supported by the stringers are roller assemblies 24.

The module 13 is of a similar construction to the module 12 except that it is provided with a trough member 35 which is supported by the beams 23 and extends longitudinally of the module 13. The trough member 35 supports the belt 17(B) which slides along the trough member 35. Suspended from the trough member 35 is a belt protection tray 36 which protects the belt portion 17(A). The module 13 has its forward two posts 18, each provided with a cylinder 21 and associated piston rod 22, while the beams 23 are pivotally mounted by having the cradles pivotally attached to the piston rods 22. In the case of the rear posts 18, cradles pivotally attached thereto also support the beams 23. Further in relation to the module 13, it should be appreciated that the trough member 35 does not extend the full longitudinal length of the module 13. Additionally the module 13 is provided with a supply of roller assemblies 24.

The module 13 is also provided with a guard 37.

A tray can be provided with a supply of pins and other items to enable construction of the structure 16. The tray would also receive the supply of roller assemblies 24 and would conveniently be mounted on the module 13.

The module 12 receives a "cassette" module 38 which includes a frame 39 supporting a plurality of transom frames 30 and two stacks 40 of stringers 34.

In operation of the above described boot end 10, assembly 11 and structure 16, the structure 16 is gradually formed as the boot end 10 moves forward. More particularly, as the structure 16 is formed and the modules 12 and 13 move forward by being dragged over the mine floor, the structure 16 slides from the rear of the module 13. The structure 16 is formed by successively attaching each frame 30 to stringers 34. The stringers 34 are removed from their associated stacks 40, with the stringers 34 on the remote side from the stacks 40 being slid across the skid bars 28 so as to drop into place in the associated cradles 33.

It should further be appreciated that the reverse operation can take place. That is, the modules 12 and 13 can be reversed in direction and the structure 16 dismantled in the opposite sequence to the above discussed assembly.

Figure 1:
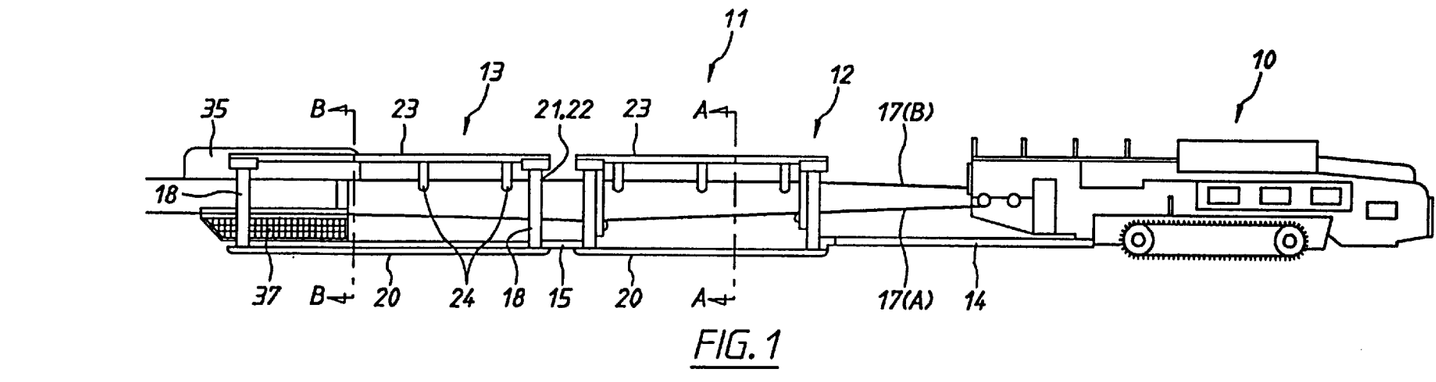
FIG. 1 is a schematic side elevation of a mining belt boot end and a belt structure installation/removal assembly.
Figure 2:
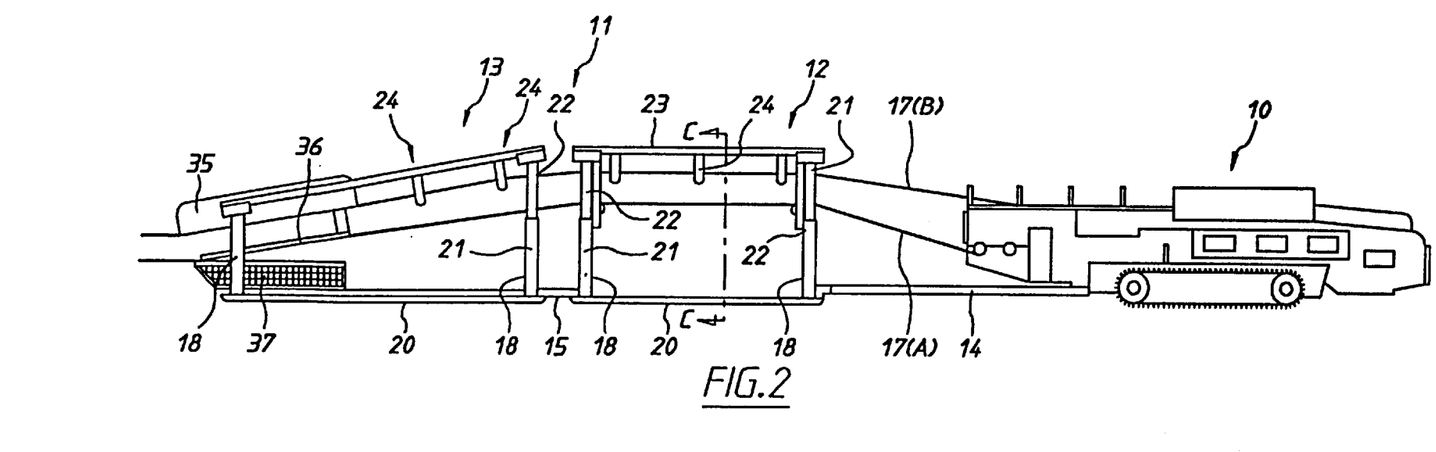
FIG. 2 is a schematic side elevation of the boot end and assembly of FIG. 1 in a further configuration.
Figure 3:
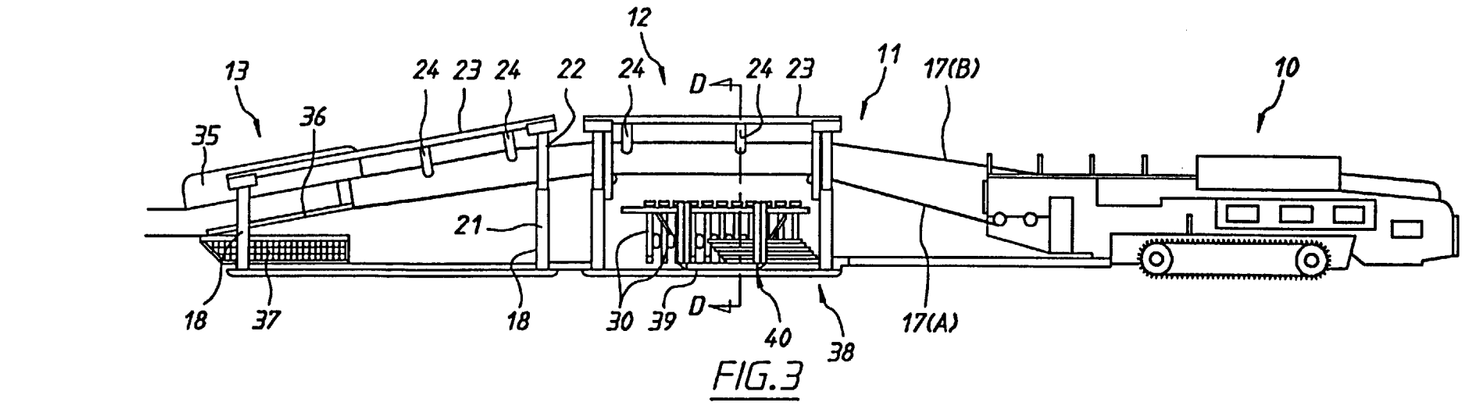
FIG. 3 is a schematic side elevation of the boot end and assembly of FIG. 1, provided with conveyor structure elements to be added to a conveyor structure to follow the assembly of FIG. 1.
Figure 4:
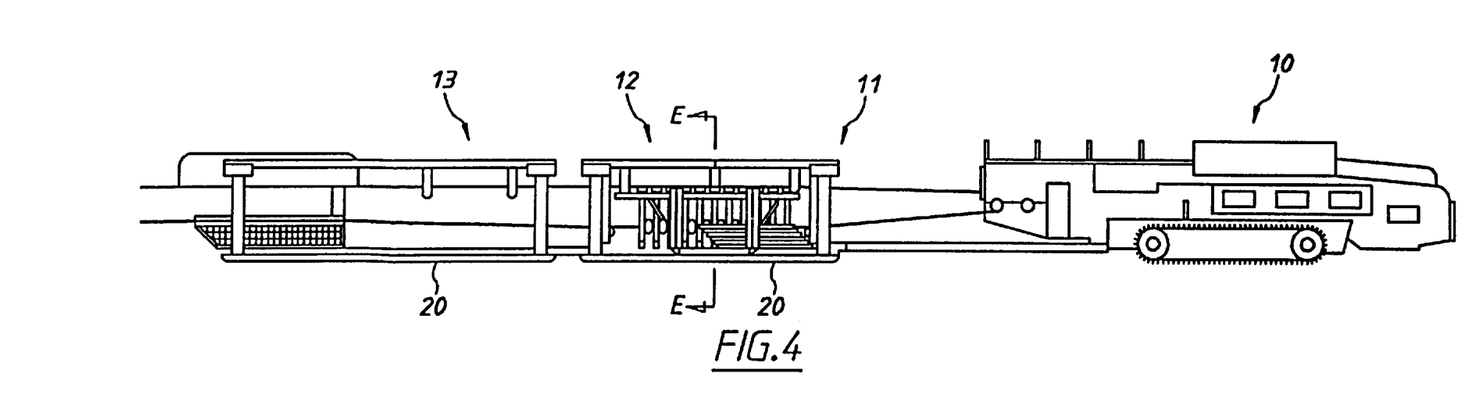
FIG. 4 is a schematic side elevation of the boot end and assembly of FIG. 3.
Figure 5:
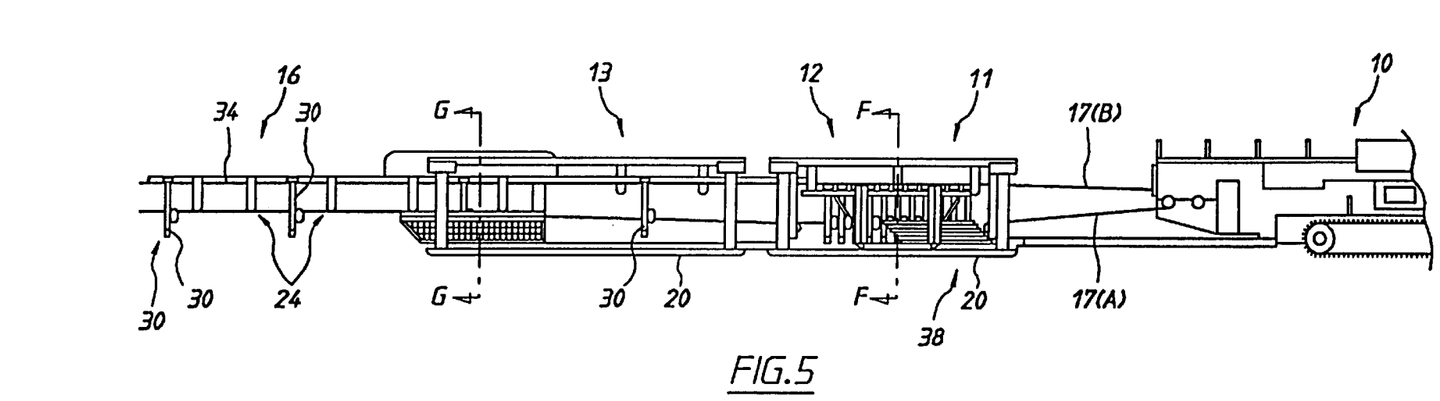
FIGS. 5 and 6 are schematic side elevations of the boot end and assembly of FIG. 4 with a conveyor structure extending therefrom.
Figure 6:
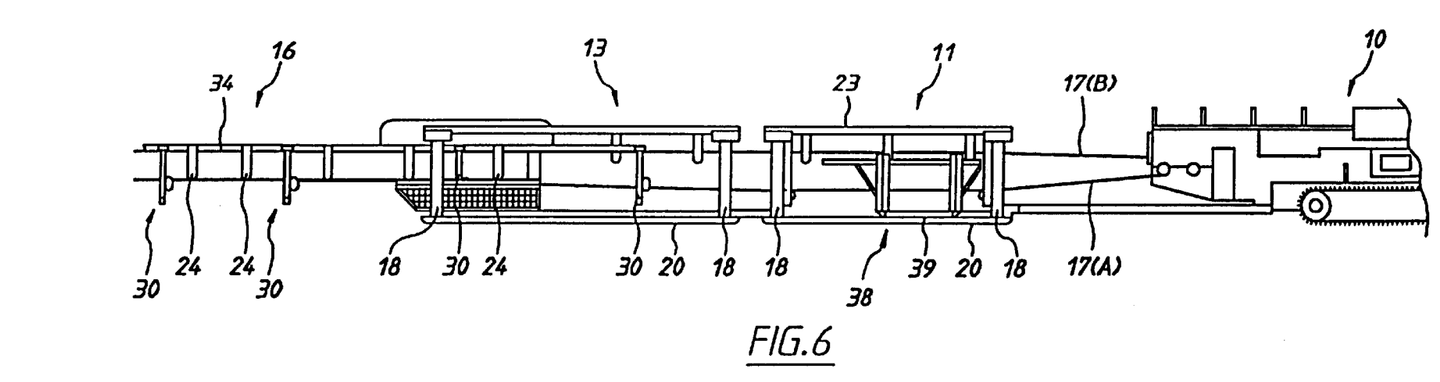
Figure 7:
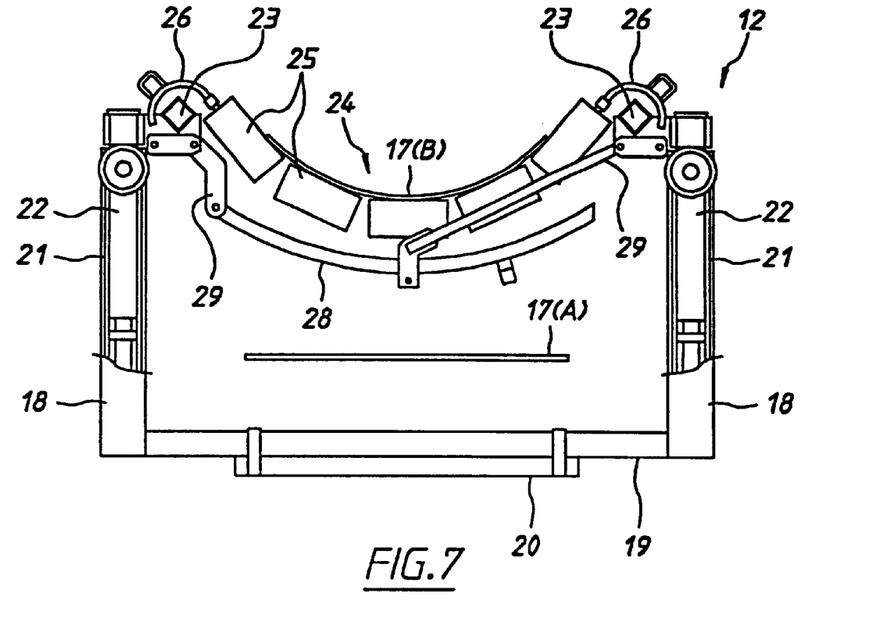
FIG. 7 is a schematic section end elevation of the assembly of FIG. 1 sectioned along the line A—A.
Figure 8:
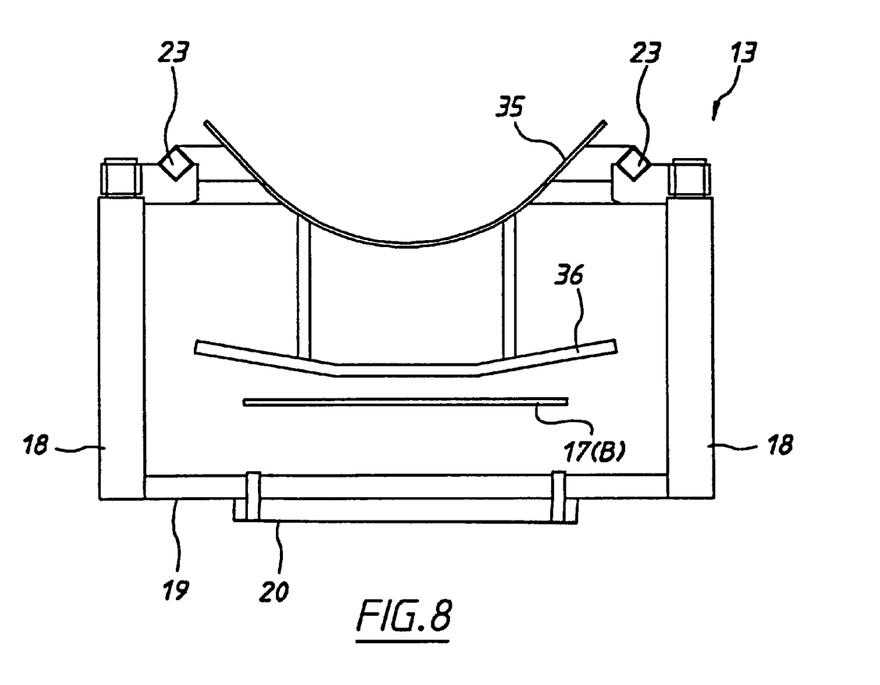
FIG. 8 is a schematic end elevation of the assembly of FIG. 1 sectioned along the line B—B.
Figure 9:
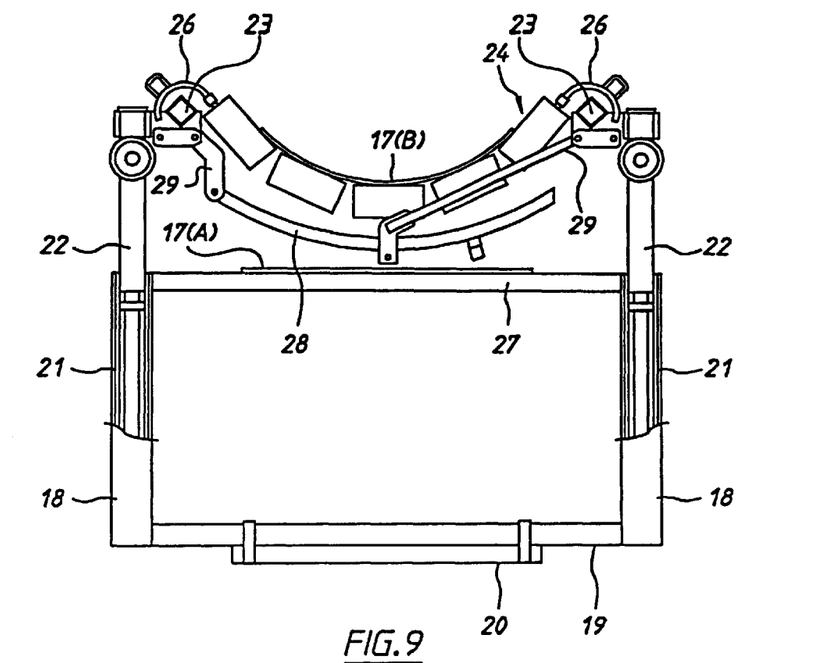
FIG. 9 is a schematic end elevation of the assembly of FIG. 2 sectioned along the line C—C.
Figure 10:
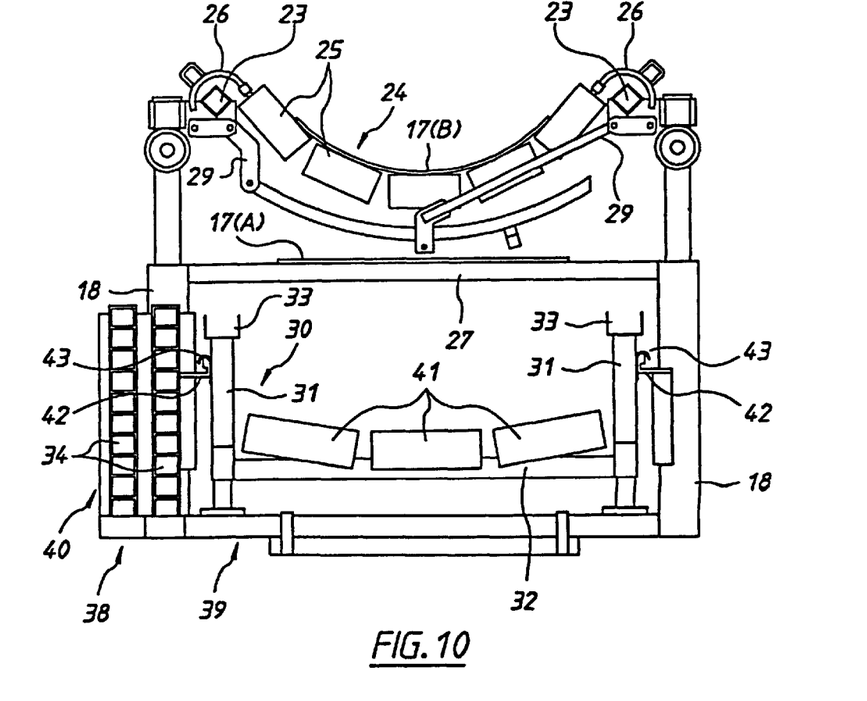
FIG. 10 is a schematic end elevation of the assembly of FIG. 3 sectioned along the line B—B.
Figure 11:
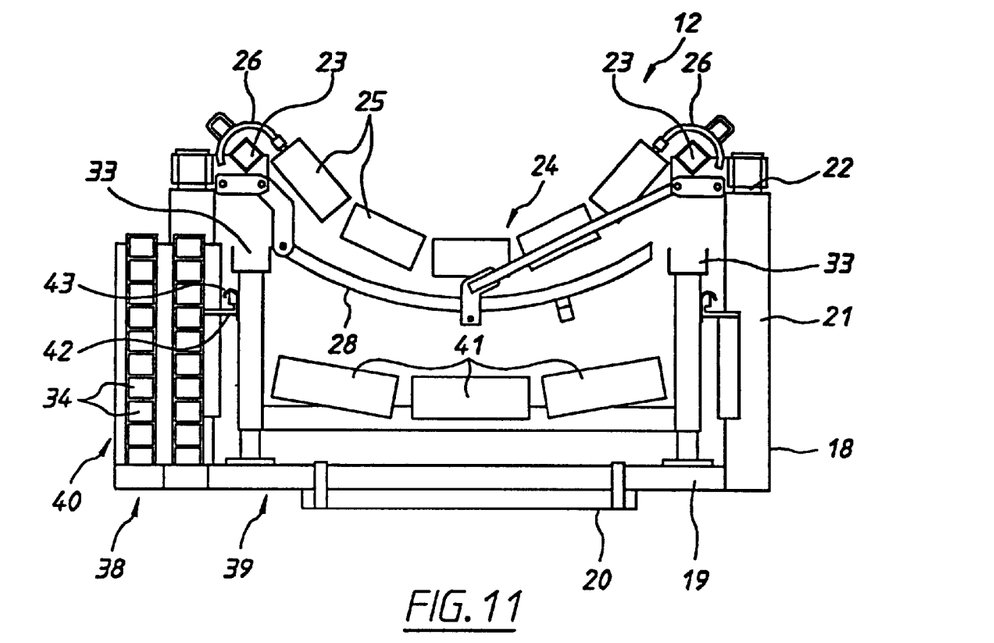
FIG. 11 is a schematic end elevation of the assembly of FIG. 4 sectioned along the line E—E.
Figure 12:
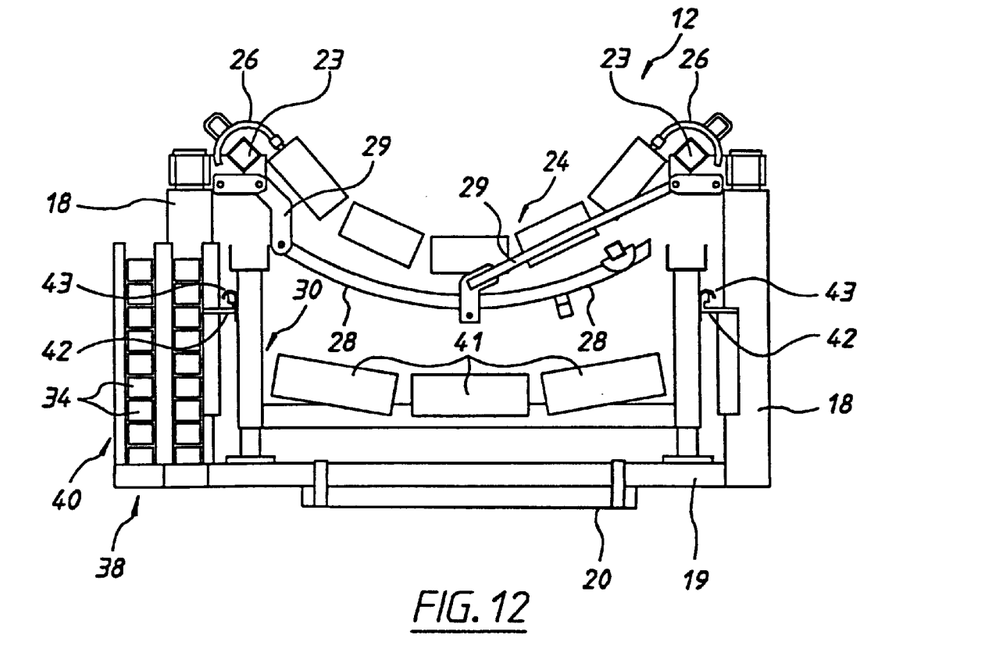
FIG. 12 is a schematic end elevation of the assembly of FIG. 5 sectioned along the line F—F.
Figure 13:
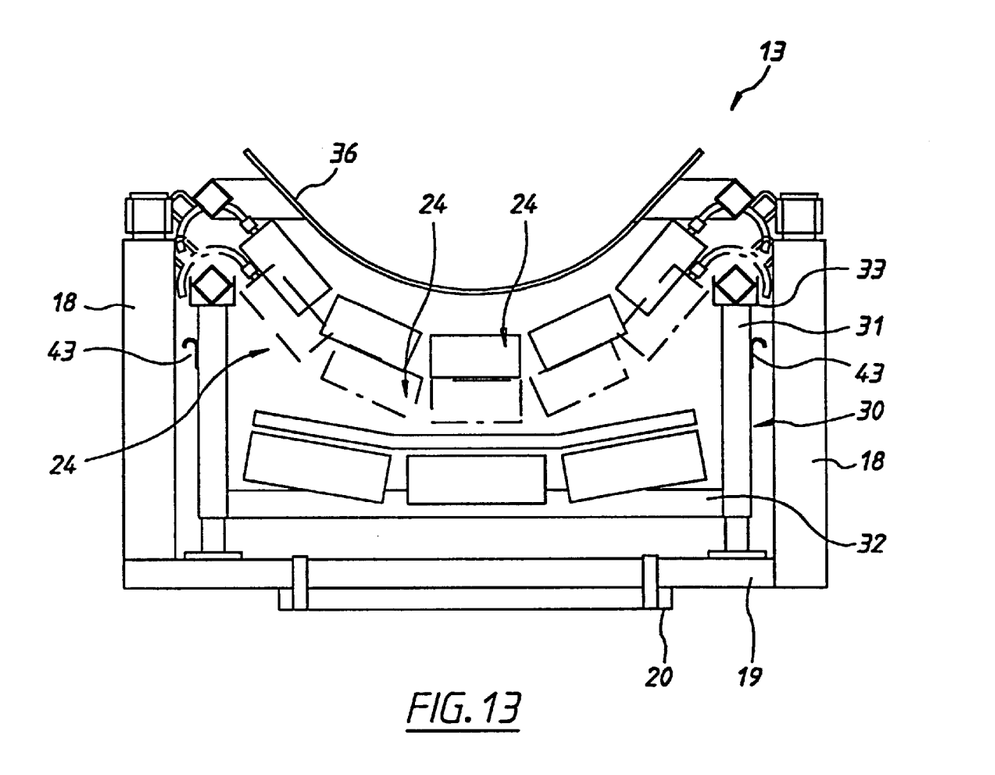
FIG. 13 is a schematic end elevation of the assembly of FIG. 5 sectioned along the line G—G.

The module 12 has the piston rod 22 raised, to raise the stringer beam 23 (and associated roller assemblies 24) to enable insertion of the cassette module 38. When the module 38 is inserted (as seen in FIG. 3) the piston rods 22 are lowered so the belt 17 is also lowered to the position shown in FIG. 4. Each frame 30 is then successively attached to a stringer 34 and gradually moves at the rear of the module 13. As the stringers 34 move through the module 13 the roller assemblies 24 are hung from the stringers 34. As the roller assemblies 24 exit the rear of the module 13, the belt portion 17(B) is then supported thereby. The belt portion 17(A) is supported by the rollers 41 when the piston rods 22 are moved to their lower position. During movement of the piston rods 22, the stringer beams 23 of the module 13 are inclined as best seen in FIGS. 2 and 3.

The modules 13 and 38 are provided with longitudinally extending rails 42 which support the frames 30 in a raised portion enabling the frames to move longitudinally of the modules 12 and 13. The rails 42 slidably engaged hooks 43 on the frames 30. A connecting rail would extend between the rail 42 of the module 38 and the rail 42 of the module 13.

The claims defining the invention are as follows:

1. A conveyor assembly to support a conveyor belt, said assembly structure including:
   a first module comprising:
      a base frame;
      an upper frame supported on the base frame for generally vertical movement relative to the base frame;
      motor means extending between the base frame and the upper frame to cause the generally vertical movement when required;
      belt support means on said upper frame to support a portion of said belt for movement relative to said base frame; and
   a further module towed by said first module, the further module comprising:
      a base frame having a first end adjacent the first module and a remote end;
      an upper frame supported on the further module base frame for movement relative thereto;
      support on the upper frame of the further module to support a portion of said belt for movement relative to the base frame of the further module; and
      means to cause relative movement between the base frame and upper frame of the further module between a first portion at which the upper frame of the further module is aligned with the upper frame of the first module and an inclined position in which the upper frame of the further module slopes downwardly from said first end to said second end, with the support means of the further module at said first end being at approximately the same height as the belt support means of the first module.

2. The conveyor assembly of claim 1, wherein the belt support means of the further module includes a trough member.

3. The assembly of claim 1 wherein the first module is configured to receive a plurality of frame members from which a conveyor structure is formed.

4. The assembly of claim 1, wherein the base frame of the first module includes skid pads to engage a ground surface over which the first module is towed.

5. The assembly of claim 1, wherein the first module has four corners and the motor means includes four hydraulic rams, one of each of said rams located adjacent one of said four corners of said first module.

6. A conveyor assembly to support a conveyor belt, said assembly structure including:
   a first module comprising:
      a base frame;
      an upper frame supported on the base frame for generally vertical movement relative to the base frame;
      motor means extending between the base frame and the upper frame to cause the generally vertical movement when required;
      belt support means on said upper frame to support a plurality of portions of said belt for movement relative to said base frame, said belt support means including first supports for a first portion of said belt and second supports for a second portion of said belt, said first and second belt portions moveable in opposite directions; and
   a further module towed by the first module, the further module comprising:
      a base frame having a first end adjacent the module and a remote end;
      an upper frame supported on the further module base frame for movement relative thereto;

support means on the upper frame of the further module to support a portion of said belt for movement relative to the base frame of the further module; and means to cause relative movement between the base frame and upper frame of the further module between a first position at which the upper frame of the further module is aligned with the upper frame of the first module and an inclined position in which the upper frame of the further module slopes downwardly from said first end to said second end, with the support means of the further module at said first end being at approximately the same height as the belt support means of the first module.

7. The assembly of claim 6 wherein said second supports are located below said first supports.

8. A conveyor module to support a conveyor belt, said structure comprising:

a base frame;

an upper frame supported on the base frame for generally vertical movement relative to the base frame, said base frame and said upper frame forming four corners of the module;

motor means extending between the base frame and the upper frame to cause the generally vertical movement when required, said motor means including four hydraulic rams, one of each of said rams located adjacent one of said four corners of the module; and belt support means on said upper frame to support a plurality of portions of said belt for movement relative to said base frame, said belt support means including first supports for a first portion of said belt and second supports, located below said first supports, for a second portion of said belt, said first and second belt portions moveable in opposite directions.

* * * * *